United States Patent
Song et al.

(10) Patent No.: US 7,366,222 B2
(45) Date of Patent: Apr. 29, 2008

(54) WIRELESS COMMUNICATION SYSTEM AND METHOD USING GROUPING MAXIMUM LIKELIHOOD DETECTION

(75) Inventors: Seog-Ill Song, Daejeon (KR); Hyun-Seo Oh, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 630 days.

(21) Appl. No.: 10/729,755

(22) Filed: Dec. 4, 2003

(65) Prior Publication Data

US 2004/0120415 A1 Jun. 24, 2004

(30) Foreign Application Priority Data

Dec. 24, 2002 (KR) ............ 10-2002-0083746

(51) Int. Cl.
  *H04B 1/69* (2006.01)
(52) U.S. Cl. ............................................ 375/130
(58) Field of Classification Search ........ 375/262, 375/347, 144, 148, 267, 341, 130; 455/63, 455/64; 714/794, 795
See application file for complete search history.

(56) References Cited

U.S. PATENT DOCUMENTS

| | | | | |
|---|---|---|---|---|
| 5,425,050 | A | * | 6/1995 | Schreiber et al. ............ 375/141 |
| 5,809,060 | A | | 9/1998 | Cafarella et al. |
| 5,856,971 | A | * | 1/1999 | Gitlin et al. ............... 370/335 |
| 5,960,032 | A | | 9/1999 | Letaief et al. |
| 6,041,034 | A | | 3/2000 | Fukumasa et al. |
| 6,075,812 | A | | 6/2000 | Cafarella et al. |
| 6,144,653 | A | | 11/2000 | Persson et al. |
| 6,161,209 | A | | 12/2000 | Moher |
| 6,373,861 | B1 | * | 4/2002 | Lee .............................. 370/503 |
| 6,377,632 | B1 | | 4/2002 | Paulraj et al. |
| 6,487,255 | B1 | * | 11/2002 | Arslan et al. ................ 375/262 |
| 6,628,667 | B1 | | 9/2003 | Murai et al. |
| 2002/0122510 | A1 | * | 9/2002 | Yakhnich et al. ............ 375/342 |

FOREIGN PATENT DOCUMENTS

| | | |
|---|---|---|
| KR | 10-0243649 B | 11/1999 |
| KR | 10-0254480 B | 2/2000 |
| KR | 2000-63968 | 11/2000 |

(Continued)

OTHER PUBLICATIONS

Rajappan, G.S. et al., "Rate maximization for multi-code CDMA with optimized signatures", Military Communications Conference, 2001. MILCOM 2001. IEEE, pp. 1375-1379, vol. 2.

(Continued)

*Primary Examiner*—Khai Tran
(74) *Attorney, Agent, or Firm*—Blakely, Sokoloff, Taylor & Zafman

(57) ABSTRACT

Disclosed is a method for increasing a data transfer rate without an increase in the whole bandwidth using intrinsic spreading codes and orthogonal codes. The method uses interleaving, OFDM modulation/demodulation, and maximum likelihood detection (MLD) to overcome the effects of multipath fading or signal interference, determines grouped optimal values by a grouping method of dividing the intrinsic spreading codes in series, and calculates an integrated optimal value for all the intrinsic spreading codes using the grouped optimal values, thereby reducing the complexity of MLD according to the length of the intrinsic spreading code and acquiring an improved performance.

8 Claims, 3 Drawing Sheets

FOREIGN PATENT DOCUMENTS

KR  10-0340829 B  6/2002

OTHER PUBLICATIONS

Cao, Y.W., et al., "A New Multi-code/ Multi-carrier DS-CDMA System", Global Telecommunications Conference, 2001. GLOBECOM '01. IEEE, 2001 pp. 543-546 vol. 1

Park Kyung Won et al., "MIMO-OFDM Techniques for High-Speed Wireless Transmission" Telecommunication Review, Mar.-Apr. 2002, pp. 210-224, vol. 12.

Kaiser, Stephen; OFDM-CDMA versus DS-CDMA: Performance Evaluation for Fading Channels, IEEE, 1995, p. 1722-1726.

* cited by examiner

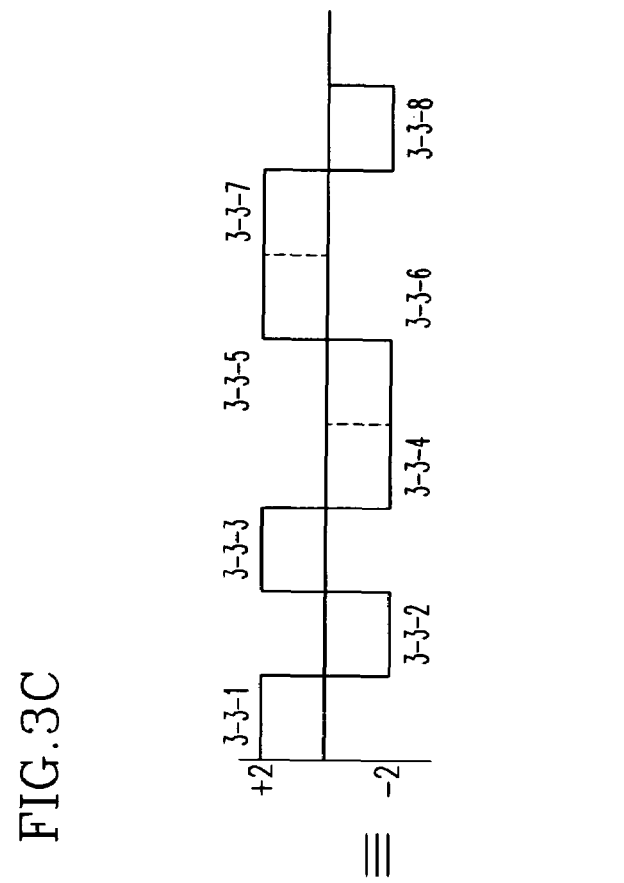
FIG.3A
FIG.3B
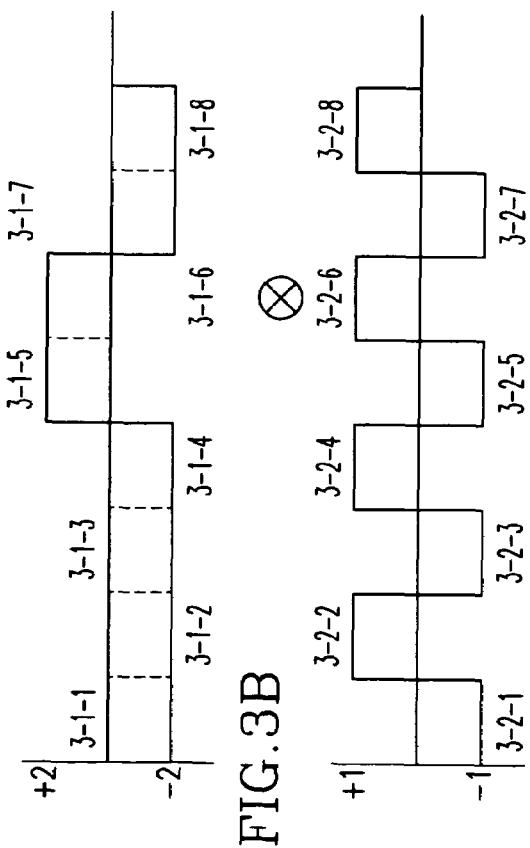
FIG.3C

WIRELESS COMMUNICATION SYSTEM AND METHOD USING GROUPING MAXIMUM LIKELIHOOD DETECTION

CROSS REFERENCE TO RELATED APPLICATION

This application is based on Korea Patent Application No. 2002-83746 filed on Dec. 24, 2002 in the Korean Intellectual Property Office, the content of which is incorporated herein by reference.

BACKGROUND OF THE INVENTION (a) Field of the Invention

The present invention relates to a system and method for reducing the effects of multi-path fading and signal interference in a system using orthogonal codes and binary signal values. More specifically, the present invention relates to a maximum likelihood detection (MLD) system and method that reduces the complexity of MLD and improves performance in the system using orthogonal codes and binary signal values.

(b) Description of the Related Art

The modulation/demodulation methods for supporting a data transfer rate increasing in a confined frequency band include the quadrature amplitude modulation (QAM) method. The QAM modulation method may enhance the data transfer rate because the amount of information increases with an increase in the constellation, but it has a problem in regard to its mobility and application for 16-QAM or greater with a separation of more than a predetermined value. Namely, the QAM method is susceptible to the effect of distortion because the redundancy of noise decreases with an increase in the constellation. That is, the QAM modulation method has a trade-off relationship between information and noise.

It is known that the channel capacity of channels having a rich scattering characteristic is proportional to the number of transceiver antennas in the same bandwidth. Hence, studies have been done on a method for detecting received signals using a multiple input/multiple output (MIMO) antenna system with a plurality of antennas so as to increase channel capacity. But this method is known to have a problem in regard to its implementation, because the mobile terminal concerned is required to have a plurality of antennas and a rich scattering characteristic for channels.

In addition, there has been recently suggested a method for increasing data transfer rate without an increase in the entire bandwidth for users by using an intrinsic spreading code and orthogonal codes. But this method, which utilizes binary values, has problems in regard to overcoming the effects of multipath fading or signal interference and the complexity of MLD calculations according to the length of the spreading code.

SUMMARY OF THE INVENTION

It is an advantage of the present invention to solve the problems with prior art and to provide a system and method for overcoming the effects of multipath fading or signal interference that is taken into consideration in the multipath environment.

It is another advantage of the present invention to reduce the complexity of calculations according to the length of the intrinsic spreading code in MLD and to improve the performance, thereby reducing the complexity in the system implementation.

In one aspect of the present invention, there is provided a wireless communication system that includes: a transmitter including an orthogonal encoder for converting serially input binary signals to parallel binary signals and orthogonally encoding the parallel binary signals, a first multiplier for multiplying the orthogonally encoded binary signals by an intrinsic spreading code to spread the orthogonally encoded binary signals, and an OFDM (Orthogonal Frequency Division Multiplexing) modulator for OFDM-modulating the spread signals; and a receiver including an OFDM demodulator for demodulating the OFDM-modulated signals, and a maximum likelihood detector for performing a maximum likelihood detection of the demodulated spread signals.

The maximum likelihood detector groups the OFDM-demodulated signals into a predetermined number of blocks to perform the maximum likelihood detection, and uses the grouped maximum likelihood detection values to perform a whole maximum likelihood detection.

The transmitter of the wireless communication system further includes: a first serial-to-parallel converter for serial-to-parallel converting the signals spread with the intrinsic spreading code; and an interleaver for interleaving the serial-to-parallel converted signals and sending the interleaved signals to the OFDM modulator. The receiver further includes: a deinterleaver for deinterleaving the OFDM-demodulated signals; and a first parallel-to-serial converter for parallel-to-serial converting the deinterleaved signals and sending the parallel-to-serial converted signals to the maximum likelihood detector.

The maximum likelihood detector includes: a second multiplier for multiplying the OFDM-demodulated signals by the intrinsic spreading code; a grouping section for grouping the multiplied signals into blocks; a grouping maximum approximation detector for performing a maximum likelihood detection of the grouped blocks; an integrated maximum approximation detector for performing a whole maximum likelihood detection based on the grouped maximum approximation values; an orthogonal despreader for orthogonally despreading a sequence having a maximum approximation value to output parallel signals; and a second parallel-to-serial converter for converting the parallel output signals to serial signals.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 3 is a signal diagram showing the multiplication of orthogonal codes and intrinsic spreading codes.

DETAILED DESCRIPTION OF THE PREFERRED EMBODIMENTS

Figure 1:
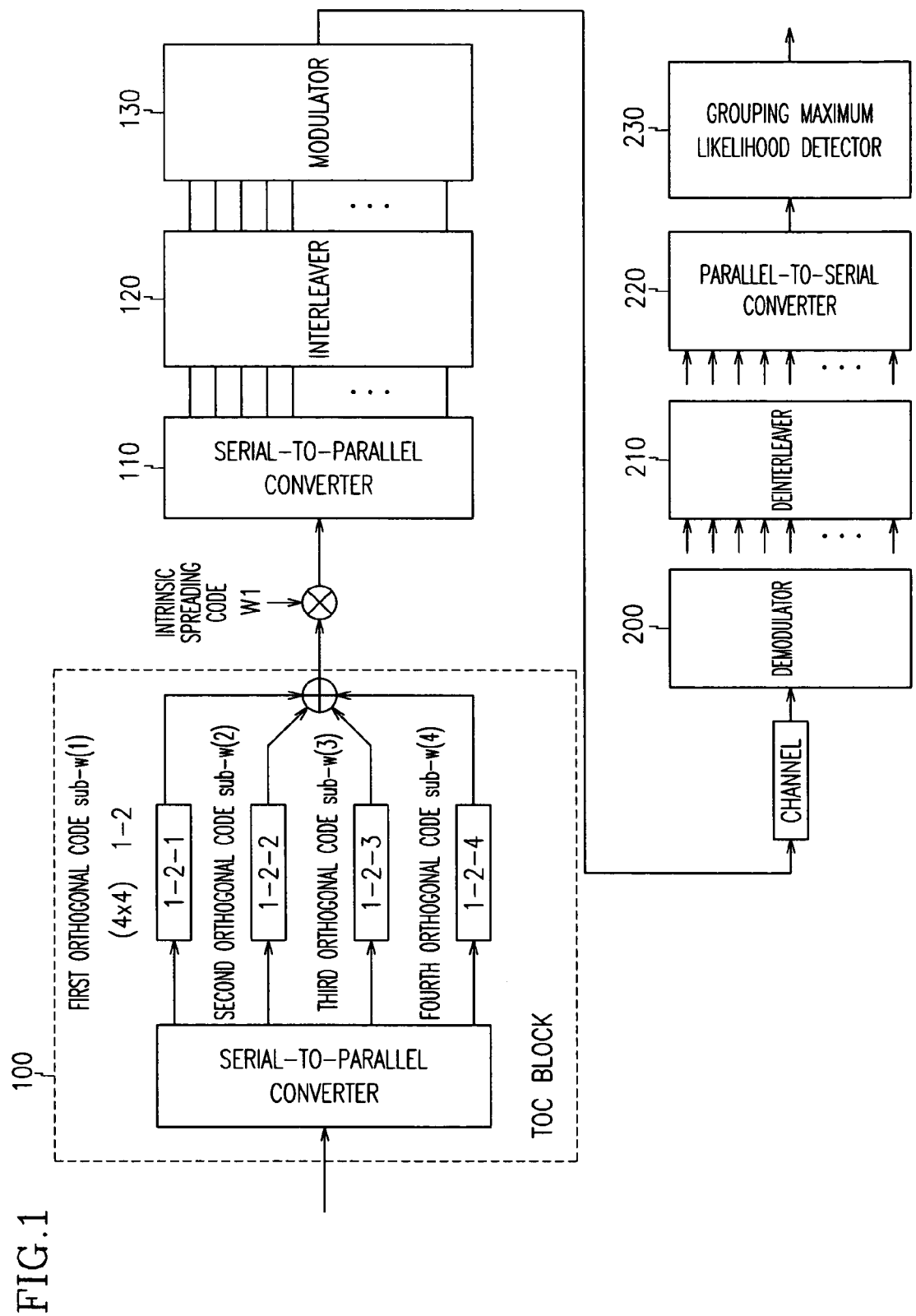
FIG. 1 is a block diagram of a wireless communication system according to an embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

For an evident description of the present invention, the parts not related to the description are omitted in the illustrations. The same reference numerals are assigned to the same parts all through the specification.

Hereinafter, the embodiment of the present invention will be described in detail with reference to the accompanying drawings.

FIG. 1 is a block diagram of a wireless communication system according to the embodiment of the present invention.

The wireless communication system according to the embodiment of the present invention comprises a transmitter that includes a single orthogonal code (hereinafter referred to as "TOC") block 100 including a serial-to-parallel converter 101, and an orthogonalizer using first to fourth orthogonal codes (hereinafter expressed as "Sub-w(1,2,3,4)"), a serial-to-parallel converter 110, an interleaver 120, and an OFDM modulator 130; and a receiver that includes an OFDM demodulator 200, a deinterleaver 210, a parallel-to-serial converter 220, and a grouping maximum likelihood detector 230. Here, the configuration shown in the TOC block corresponds to the basic structure of the prior art for increasing channel capacity using orthogonal codes and binary signals.

The TOC block 100 orthogonalizes serially input binary signals using the first to fourth Sub-w(1,2,3,4). The orthogonalized binary signals are summated, multiplied by an intrinsic spreading code W1, and sent to the serial-to-parallel converter 110. The parallel bit streams output from the serial-to-parallel converter 110 are interleaved from the interleaver 120. The interleaved bit streams are fed into the OFDM modulator 130 for OFDM modulation. The modulated signals are sent through OFDM channels. The individual signal waveforms of the OFDM channels are present at a point where the power of the channels of a different channel center frequency approaches zero, so they cause no interference even when they are overlapped.

The OFDM modulated signals transferred on a plurality of carriers through the OFDM channels are demodulated from the OFDM demodulator 200. The demodulated signals are deinterleaved from the deinterleaver 21, converted to serial bit streams via the parallel-to-serial converter 220, and sent to the grouping maximum likelihood detector 230. The grouping maximum likelihood detector 230 performs MLD in the manner of the method that will be described later according to the embodiment of the present invention.

First, the entire signal processing procedures of the present invention system will be described in detail by way of the following example.

Input data are sent to the TOC block 100 using orthogonal codes to increase channel capacity, and to the serial-to-parallel converter 110 through an intrinsic spreading code.

It is assumed that the binary signals output from the serial-to-parallel converter 110 are d(1)=(d, −d, d, d), where d represents the minimum distance of the constellation. The orthogonal codes, the intrinsic spreading code and the binary signal data can be used in the following description, where the binary signal data 0 and 1 are respectively denoted as "−" and "+" in the orthogonal codes and the intrinsic spreading code.

Hence, the first to fourth orthogonal codes are expressed as follows:

Sub-w(1)=(1 1 1 1)→(+ + + +)

Sub-w(2)=(1 0 1 0)→(+ − + −)

Sub-w(3)=(1 1 0 0)→(+ + − −)

Sub-w(4)=(1 0 0 1)→(+ − − +)

The intrinsic spreading code, W1=(0 1 0 1 0 1 0 1) is expressed by (− + − + − + − +).

If considering d as a constant, the input data binary signals d(1)=(d, −d, d, d) from the serial-to-parallel converter 110 can be expressed by d(1)=(+1 −1 +1 +1).

Each of the first to fourth orthogonal codes Sub-w(1), Sub-w(2), Sub-w(3) and Sub-w(4) is multiplied by the binary signal d(1) to produce output code C as follows:

$C(1)=(+1\ +1\ +1\ +1)$ $C(2)=(-1\ +1\ -1\ +1)$ $C(3)=(+1\ +1\ -1\ -1)$ $C(4)=(+1\ -1\ -1\ +1).$

These output codes are summated to give S=(+2 +2 −2 +2).

The summated value S is multiplied by the intrinsic spreading code W1 to give spread data SD=(−2 +2 −2 +2 +2 −2 −2 +2).

The spread code values are the output values before the serial-to-parallel converter 110. The serial-to-parallel converted signals are fed into the interleaver 120, and the output of the interleaver 120 through the spread data SD is transferred via the OFDM modulator 130. The OFDM modulator 130 generally comprises an IFFT (Inverse Fast Fourier Transform) section, a parallel-to-serial converter, a guard interval inserter, and a carrier (RF) section, none of which are shown. The input binary spread code value SC can be output through the internal processing of the OFDM modulator 130.

Now, a process for demodulating the channel-passed input data and demapping the demodulated data into the original signals will be described in detail.

The data received through the OFDM channels are fed into the deinterleaver 210 via the OFDM demodulator 200. The OFDM demodulator 200 generally includes the functions of multiplying the noise-mixed input signals by the carrier (RF), removing an RF component via a low-pass filter (LPF), performing an A/D conversion, removing the guard interval, and performing an FFT, which functions are not shown.

The deinterleaver 210 performs the reverse process of the interleaver of the transmitter and outputs the deinterleaved data to the parallel-to-serial converter 230. After the parallel-to-serial conversion, the signal values are output as optimized values through a grouping MLD.

The spread data SD=(−2 +2 −2 +2 +2 −2 −2 +2) are multiplied by the intrinsic spreading code W1 through a multiplier. The intrinsic spreading code W1 has the same value of the intrinsic spreading code W1=(0 1 0 1 0 1 0 1) of the transmitter and is expressed by (−+−+−+−+).

The individual values of the spread data are multiplied by the intrinsic spreading code W1 to output a value of (+2 +2 +2 +2 −2 −2 +2 +2).

The output value is revised through the grouping MLD and then fed into an orthogonal despreader 234.

The data fed into the orthogonal despreader 234 are multiplied by the first to fourth orthogonal codes Sub-w(1) to (4) to give the following values:

$$(+2+2+2+2-2-2+2+2)$$
$$(-2-2+2+2-2-2-2-2)$$
$$(+2+2+2+2+2+2-2-2)$$
$$(+2+2-2-2+2+2+2+2)$$

The individual values are integrated for one period and multiplied by the value of one period (e.g., one period of W1 is 8) to give (1, −1, 1, 1), which is then multiplied by d. The restored values (d, −d, d, d) are parallel-to-serial converted into the original values.

Next, the grouping MLD process according to the embodiment of the present invention will be described in detail with reference to FIG. 2.

Figure 2:
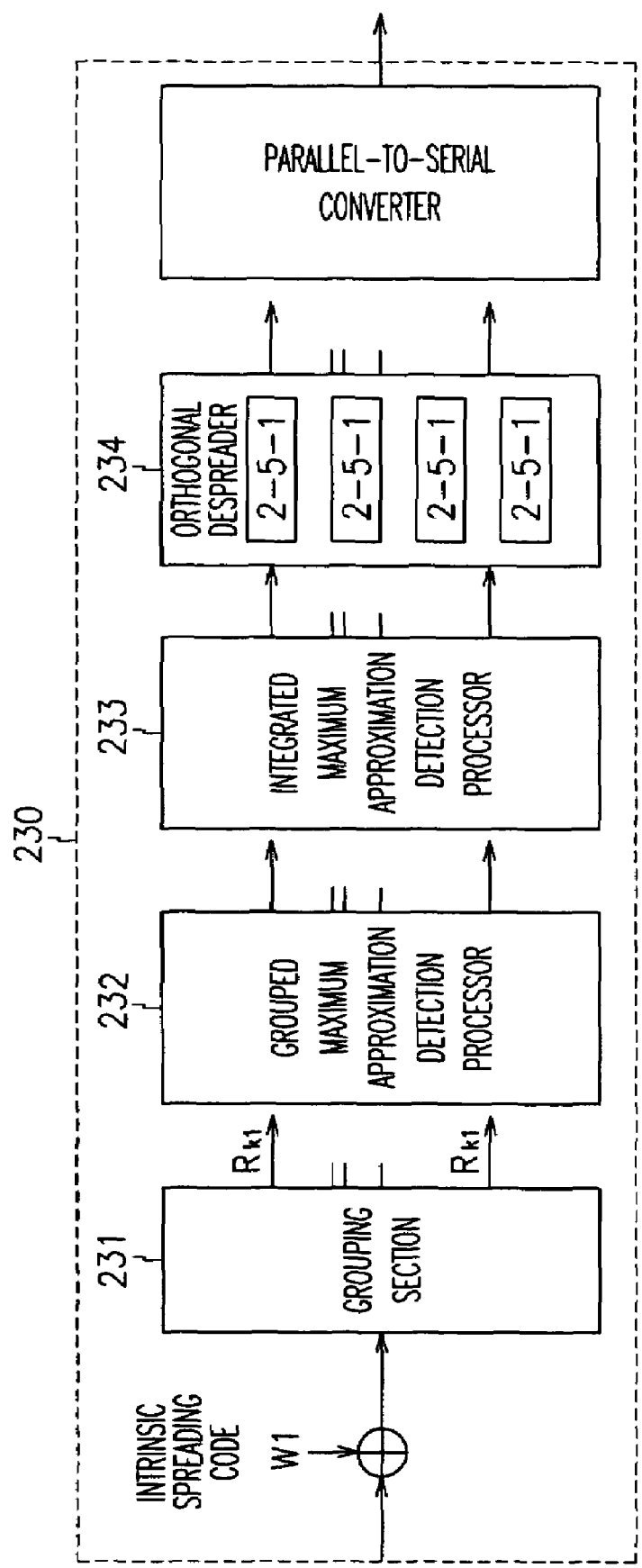
FIG. 2 is a detailed block diagram of a grouping maximum likelihood detector according to an embodiment of the present invention.

FIG. 2 is a block diagram of the grouping maximum likelihood detector. The grouping maximum likelihood detector comprises, as shown in FIG. 2, a multiplier for multiplying an input signal by the intrinsic spreading code W1, a grouping maximum approximation detection processor 232, an integrated maximum approximation detection processor 233, a deorthogonal spreader 234, and a parallel-to-serial converter 235.

Next, the operations of the grouping maximum approximation detection processor 232 and the integrated maximum approximation detection processor 233 shown in FIG. 2 will be described by way of the specific equations.

The input signals from the OFDM demodulator 200, the deinterleaver 210, and the parallel-to-serial converter 220 are fed into the grouping maximum approximation detection processor 232. The input signals are multiplied by the intrinsic spreading code W1 and then grouped by a grouping section 231.

In the grouping step, the individual bit interval information of the first to fourth orthogonal codes Sub-w(1) to (4) are summated and then multiplied by the intrinsic spreading code W1. The multiplication value is then divided by the bit interval of Sub-w(1,2,3,4) to determine the interval of the intrinsic spreading code. When the interval of the intrinsic spreading code is 8 and the Sub-w(1,2,3,4) is a 4-bit interval, each group after grouping has an interval of 2.

After grouping, the received signals $R_{k1}, R_{k2}, \ldots, R_{kl-1}$ and $R_{kl}$ are subjected to noise and Rayleigh fading. Thus the signal $R_{kl}$ represented by k vectors can be given by the following equation:

$$R_{kl} = H_{k1} S_{kl}^T + N \quad \text{[Equation 1]}$$

where the diagonal matrix $H_{k1}$ is the Rayleigh fading constant of a sub carrier allocated to the grouped block; $S_{kl}^T$ is the transposed value of the transmitted sequence; and N is the noise vector.

The grouping maximum approximation detection processor 233 performs MLD for $R_{kl}$. In the MLD, the transmitted sequence is selected that minimizes the Euclidean distance $e_j^2$ among all the available transmitted and received sequences.

Let the set of all the transmittable sequences be $V_{jl}$ (j=1, ..., $2^{Nw/Sw}$), then the Euclidean distance $e_j^2$ can be calculated from the following equation:

$$e_j^2 = \min|R_{kl} - H_k V_{jl}^T|^2 \quad \text{[Equation 2]}$$

The most approximating transmitted sequence $V_{jl} = S'_{kl}$ is selected when the Euclidean distance is at a minimum. Following the maximum approximation detection processing for k blocks, where k is the bit length of each Sub-w (1,2,3,4), the maximum likelihood value processed from the integrated maximum approximation processor 233 is used to perform the optimized MLD for integrated $R_{kl}$ blocks.

The conventional MLD algorithm, which uses the fading constant matrix $H_{kl}$, requires channel information for assigning a weight to all the transmitted sequences $V_{jl}$, so its complexity increases at a ratio of geometrical progression with an increase in the length of the sequence and a decrease in the Euclidean distance. Contrarily, the embodiment of the present invention groups all the user signals from the transmitter into blocks in the units of bit of the orthogonal code Sub-w(1,2,3,4) multiplied by the spreading code W1 allocated to the users. According to the embodiment of the present invention, $2^{Nw/Sw}$ available sequences are detected from the MLD rather than k sequences, where Nw is the interval length of the intrinsic spreading code W1; and Sw is the bit interval length of each orthogonal code. Namely, as many transmitted signals as the length of the intrinsic spreading code, Nw, are grouped into blocks in the units of bit of each Sub-w(1,2,3,4) so as to reduce the complexity of MLD. Let the code length of each Sub-w(1,2,3,4) be Sw, then the transmitted signals are grouped into Sw blocks. The partially spread block in each unit bit has the maximum approximations of $2^{Nw/Sw}$ partially spread code bits for each partially spread code bit. During transmission, the data bits $d_{jl}$, each of which is spread by the orthogonal codes Sub-w (1,2,3,4), are spread by $2^{Nw/Sw}$ partially spread code vectors.

The codes used for spreading are orthogonal Walsh-Hadamard codes and have the cross-correlation of zero. For the spread chip stream of the k-th block Sk having a length of Nw/Sw can be expressed by the following equation:

$$S_k = \sum_{i=\frac{Nw}{Sw}k+1}^{\frac{Nw}{Sw}(k+1)} Sub_{(1,2,3,4),k} C_i = \left[ s_{0,k}, s_{1,k}, \ldots, s_{(\frac{Nw}{Sw}-1),k} \right] \quad \text{[Equation 3]}$$

where C is the intrinsic spreading code.

The orthogonal despreader 235 uses the Sub-w(1,2,3,4) codes to despread the received signals spread with the Sub-w(1,2,3,4) codes and subjected to the grouping MLD process, and divides the resulting value of the despreading by the length of the intrinsic spreading code, Nw to obtain data values received from the transmitter. The data values are processed at the parallel-to-serial converter 235 into finally received data.

FIG. 3 shows an example of the multiplication of the orthogonal code by the intrinsic spreading code.

To simplify the description of the grouping process that involves the multiplication of the orthogonal code Sub-w(1, 2,3,4) by the intrinsic spreading code W1, the lengths of the intrinsic spreading code W1 and the orthogonal code are set to 8 and 4, respectively. Actually, the intrinsic spreading code has a considerably large length.

In FIG. 3, signal 3A shows the 2-fold expanded bit interval of one code of Sub-w(1,2,3,4); signal 3B is the intrinsic spreading code W1; and signal 3C shows the multiplication of the intrinsic spreading code and the Sub-w(1,2,3,4), where Nw is 8, Sw is 4, and Nw/Sw is 2. The bit interval length of Sub-w(1,2,3,4) is 4, so the length of the intrinsic spreading code Nw is grouped into 4 blocks.

Namely, the interval length of the grouped blocks is 2. Expediently, a short code length has been exemplified in this description, but it must be taken into consideration that the length of the intrinsic spreading code is considerably large.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The present invention uses the intrinsic spreading code and the orthogonal codes to increase the data transfer rate without an increase in the whole bandwidth allocated for users, and performs a grouping MLD according to the configuration of the present invention to remarkably reduce the complexity of the MLD system and improve the performance.

What is claimed is:

1. A wireless communication system comprising:
    a transmitter including an orthogonal encoder for converting serially input binary signals to parallel binary signals and orthogonally encoding the parallel binary signals, a first multiplier for multiplying the orthogonally encoded binary signals by an intrinsic spreading code to spread the orthogonally encoded binary signals, and an OFDM (Orthogonal Frequency Division Multiplexing) modulator for OFDM-modulating the spread signals; and
    a receiver including an OFDM demodulator for demodulating the OFDM-modulated signals, and a maximum likelihood detector for performing a maximum likelihood detection of the demodulated spread signals,
    the maximum likelihood detector grouping the OFDM-demodulated signals into a predetermined number of blocks, and performing maximum likelihood detection for each of the blocks to get a predetermined number of maximum likelihood detection values, and performing maximum likelihood detection for all of the predetermined number of maximum likelihood detection values.

2. The wireless communication system as claimed in claim 1, wherein the transmitter further includes:
    a first serial-to-parallel converter for serial-to-parallel converting the signals spread with the intrinsic spreading code; and
    an interleaver for interleaving the serial-to-parallel converted signals and sending the interleaved signals to the OFDM modulator,
    the receiver further including:
    a deinterleaver for deinterleaving the OFDM-demodulated signals; and
    a first parallel-to-serial converter for parallel-to-serial converting the deinterleaved signals and sending the parallel-to-serial converted signals to the maximum likelihood detector.

3. The wireless communication system as claimed in claim 1, wherein the maximum likelihood detector comprises:
    a second multiplier for multiplying the OFDM-demodulated signals by the intrinsic spreading code;
    a grouping section for grouping the multiplied signals into the predetermined number of blocks;
    a grouping maximum approximation detector for performing a maximum likelihood detection for each of the blocks to get the predetermined number of maximum likelihood detection values;
    an integrated maximum approximation detector for performing maximum likelihood detection for the predetermined number of maximum likelihood detection values;
    an orthogonal despreader for orthogonally despreading a sequence having a maximum approximation value to output parallel signals; and
    a second parallel-to-serial converter for converting the parallel output signals to serial signals.

4. The wireless communication system as claimed in claim 3, wherein the grouping section groups an interval length of the intrinsic spreading code into blocks having a bit interval length of the orthogonal code.

5. A wireless communication method comprising:
    orthogonally encoding serial binary signals;
    multiplying the orthogonally encoded serial binary signals by an intrinsic spreading code to spread the orthogonally encoded binary signals;
    OFDM-modulating the spread signals;
    OFDM-demodulating the OFDM-modulated signals:
    grouping the demodulated signals into a predetermined number of blocks;
    performing maximum likelihood detection for each of the predetermined number of blocks to get a predetermined number of maximum likelihood detection values; and
    performing maximum likelihood detection for all of the predetermined number of
    maximum likelihood detection values.

6. The wireless communication method as claimed in claim 5, further comprising:
    serial-to-parallel converting the signals spread with the intrinsic spreading code, and
    interleaving the serial-to-parallel converted signals; and
    deinterleaving the OFDM-demodulated signals; and parallel-to-serial converting the deinterleaved signals and sending the parallel-to-serial converted signals to a maximum likelihood detector.

7. The wireless communication method as claimed in claim 6, wherein said grouping the demodulated signals further comprises
    multiplying the OFDM-demodulated signals by the intrinsic spreading code,
    grouping the multiplied signals into the predetermined number of blocks.

8. The wireless communication method as claimed in claim 7, wherein the grouping comprises grouping an interval length of the intrinsic spreading code into the blocks having a bit interval length of the orthogonal code.

* * * * *